United States Patent
Dadam et al.

(10) Patent No.: US 11,680,503 B2
(45) Date of Patent: Jun. 20, 2023

(54) EXHAUST SOUND TUNING SYSTEM AND METHOD

(71) Applicant: Ford Global Technologies, LLC, Dearborn, MI (US)

(72) Inventors: Sumanth Reddy Dadam, New Hudson, MI (US); Vinod Ravi, Canton, MI (US); Di Zhu, Canton, MI (US); Vivek Kumar, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 17/203,279

(22) Filed: Mar. 16, 2021

(65) Prior Publication Data

US 2022/0298941 A1    Sep. 22, 2022

(51) Int. Cl.
 F01N 1/16    (2006.01)
 G10K 11/16    (2006.01)

(52) U.S. Cl.
 CPC ............. *F01N 1/163* (2013.01); *F01N 1/165* (2013.01); *F01N 1/166* (2013.01); *G10K 11/161* (2013.01); *F01N 2240/36* (2013.01); *F01N 2900/12* (2013.01)

(58) Field of Classification Search
 CPC . F01N 1/16; F01N 1/161; F01N 1/163; F01N 1/165; F01N 1/18; F01N 2410/14; F01N 2900/12; F01N 2240/36; G01S 2013/9325; G01S 17/931; G01S 13/931; G01S 15/93; G01S 2013/9314–93277; G01S 2015/932–936; G10K 11/16; G10K 11/161
 See application file for complete search history.

(56) References Cited

U.S. PATENT DOCUMENTS

| | | | |
|---|---|---|---|
| 6,701,890 B1 | 3/2004 | Suhre et al. | |
| 6,938,729 B2* | 9/2005 | Worner | F01N 13/02 181/254 |
| 7,406,823 B2 | 8/2008 | Takahashi | |
| 9,541,016 B2* | 1/2017 | Hashimoto | F02D 41/12 |
| 2012/0023910 A1* | 2/2012 | Parrish | F02D 41/029 60/277 |
| 2013/0037005 A1* | 2/2013 | Graf | F02M 35/1294 123/481 |
| 2014/0250864 A1* | 9/2014 | Heinecke | A01D 41/127 60/311 |
| 2017/0197612 A1* | 7/2017 | Rostocki | B60W 10/08 |
| 2018/0252131 A1* | 9/2018 | Akrapovic | F01N 1/163 |
| 2019/0010885 A1 | 1/2019 | Dudar | |

(Continued)

OTHER PUBLICATIONS

Dadam, S. et al., "Exhaust Tuning System and Method," U.S. Appl. No. 16/749,259, filed Jan. 22, 2020, 45 pages.

(Continued)

*Primary Examiner* — Mickey H France
(74) *Attorney, Agent, or Firm* — Vincent Mastrogiacomo; McCoy Russell LLP (57) ABSTRACT

Methods and systems are provided for adjusting a position of an exhaust valve that regulates engine exhaust noise. In one example, the position of the exhaust valve is adjusted according to a distance between a first vehicle and a second vehicle. The exhaust valve may be adjusted to reduce an exhaust noise level when the distance between the first vehicle and the second vehicle is less than a threshold distance.

20 Claims, 8 Drawing Sheets

(56) References Cited

U.S. PATENT DOCUMENTS

2020/0049040 A1\* 2/2020 Drees .................. F02D 9/04
2020/0318521 A1\* 10/2020 Ravi ................. F02B 77/086
2021/0071555 A1 3/2021 Dadam et al.
2021/0222595 A1\* 7/2021 Dadam ................ F01N 9/00

OTHER PUBLICATIONS

Bhat, R. et al., "Methods and System for Controlling an Engine With Two Throttles," U.S. Appl. No. 17/202,803, filed Mar. 16, 2021, 29 pages.
Cecott, C. et al., "Methods and System for Controlling an Engine With Two Throttles," U.S. Appl. No. 17/202,727, filed Mar. 16, 2021, 28 pages.

\* cited by examiner

EXHAUST SOUND TUNING SYSTEM AND METHOD

FIELD

The present description relates generally to methods and systems for adjusting a position of valve of an exhaust system that may be positioned to change a level of sound that emanates from a vehicle exhaust system.

BACKGROUND/SUMMARY

A valve in an engine's exhaust system may be adjusted to change sound of engine exhaust. The valve's position may be adjusted according to a mode that a user manually selects. The modes may include but are not limited to a baseline mode, sport mode, track mode, and quiet mode. Exhaust system noise may be reduced by adjusting to a position that corresponds to a quiet mode where engine noise may be reduced for driving in urban areas. On the other hand, the exhaust valve may be adjusted to produce louder engine exhaust noise and improve engine performance when the valve is adjusted to a position that corresponds to a track mode. The valve may also be adjusted to an intermediate position that corresponds to a sport mode. The intermediate position may cause engine noise to be greater than may be desired for engine noise in urban areas, but less than engine noise when the vehicle is operating on a closed track. Even with these valve adjustments, exhaust noise from a vehicle may distract operators of other vehicles for a short period. The distraction may not be desired in some circumstances.

The inventors herein have recognized the above-mentioned issues and have developed a method for operating an exhaust system of an engine, comprising: adjusting a position of valve in an exhaust system in response to a distance between a first vehicle that includes the exhaust valve and a second vehicle, the valve positioned downstream of an exhaust gas after treatment device.

By adjusting a position of a valve of an exhaust system in response to a distance between a first vehicle that includes the exhaust valve and a second vehicle, it may be possible to provide the technical result of reducing a possibility of distracting drivers of other vehicles. In one example, the distance may be measured as a distance between a front end of the first vehicle and a rear end of the second vehicle. In another example, the distance may be measured as a distance between a rear end of the first vehicle and a front end of a second vehicle. In still other examples, the distance may be measured between a side of the first vehicle and a side of a second vehicle. In this way, it may be possible to reduce audible distractions to other vehicles.

The present description may provide several advantages. In particular, the approach may reduce distractions for drivers of other vehicles. Further, the approach may curb vehicle noise during situations where a driver forgets to change an exhaust mode. In addition, the approach may reduce a possibility of exhaust noise increases when a driver of the vehicle does not expect exhaust noise to increase, when a transmission automatically downshifts, for example.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for operating a valve of an exhaust system. The valve of the exhaust system may be adjusted to control engine exhaust noise for a plurality of vehicle modes. The positon of the valve of the exhaust system may also be adjusted according to a distance between a vehicle that includes the valve of the exhaust system and a second vehicle. Maps describing exhaust valve position for different vehicle modes and distances between vehicles may be provided to control the valve of the exhaust system.

Figure 1A:
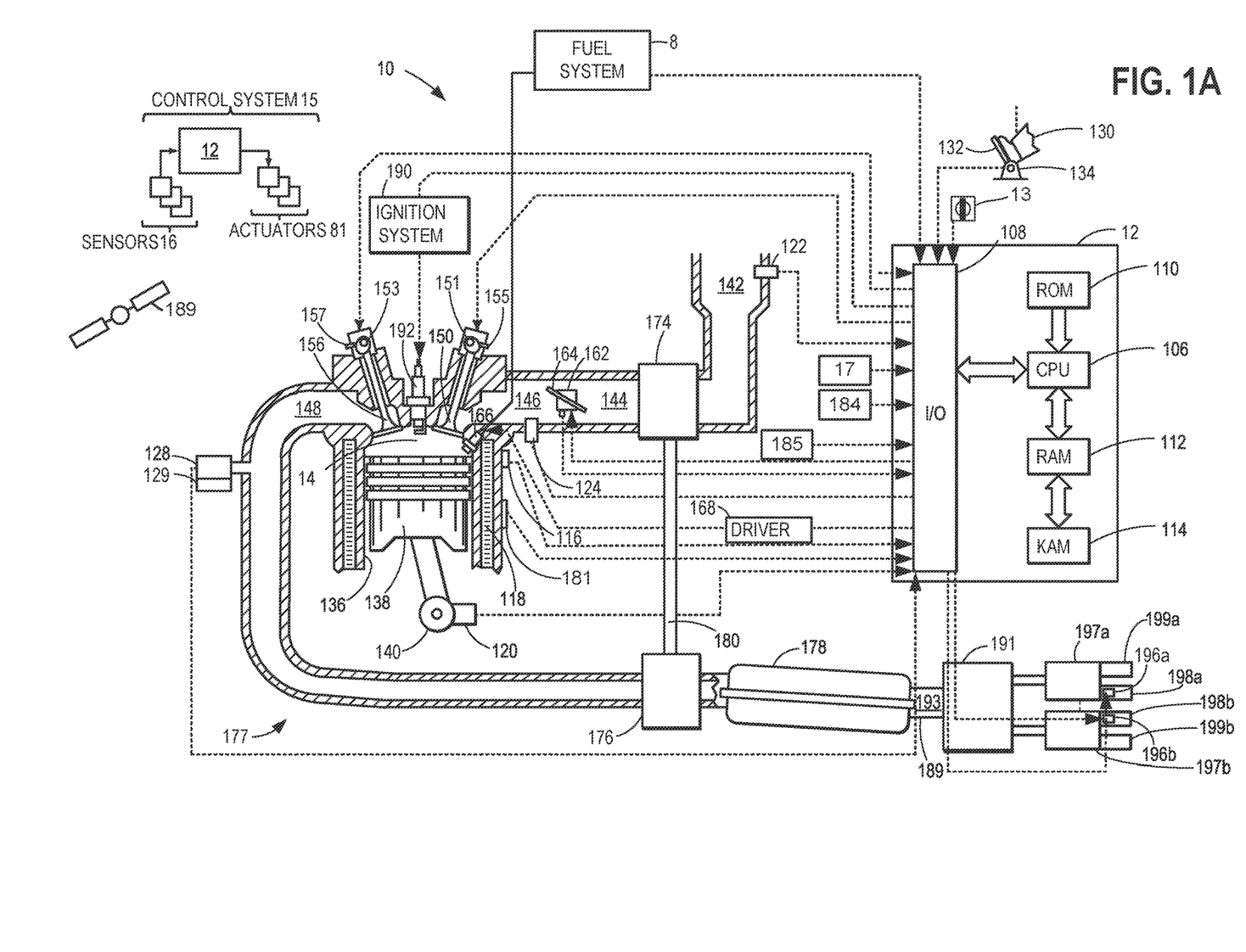
FIG. 1A shows an example internal combustion engine with variable exhaust tuning system.

FIGS. 1A-2B may be discussed collectively to provide a clear description. FIG. 1A depicts an example embodiment of a combustion chamber or cylinder of internal combustion engine 10. Engine 10 may receive control parameters from a control system including controller 12 and input from a human vehicle operator 130 via an input device 132. In this example, input device 132 includes a torque or power request pedal and a pedal position sensor 134 for generating a proportional pedal position signal. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system as shown in FIG. 1B. Further, a starter motor may be coupled to crankshaft 140 via a flywheel to enable a starting operation of engine 10. Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1A shows engine 10 configured with a turbocharger including a compressor 174 arranged between intake passages 142 and 144, and an exhaust turbine 176 arranged along exhaust passage 148 of exhaust system 177. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1A, or alternatively may be provided upstream of compressor 174.

Exhaust passage 148 may receive exhaust gases from other cylinders of engine 10 in addition to cylinder 14. Thus, exhaust flows from engine 10 to turbine 176 and then to emissions control device (e.g., three way catalyst, oxidation catalyst, particulate filter, or combination thereof) 178. Exhaust gas sensor 128 is shown coupled to exhaust temperature sensor 129 of exhaust passage 148 upstream of emission control device 178. In an alternate embodiment, these sensors may not be located adjacent to one another and may be dispersed through exhaust passage 148. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof. Exhaust gas sensor 128 and exhaust temperature sensor 129 provide input to controller 12 via input/output ports 108.

Exhaust tuning resonator 191 may receive exhaust gases from emission control device 178 via post-treatment passage 193 having post-treatment walls 189. Resonator 191 may be fluidically coupled to emission control device 178 via post-treatment passage 193. In an example, resonator 191 may also be fluidically coupled to a first muffler 197a, and resonator 191 may also be fluidically coupled to a second muffler 197b. In one example, the first muffler 197a may be fluidically connected to a first muffler inner exhaust port 198a and a first muffler outer exhaust port 199a. In another example, the second muffler 197b may be fluidically connected to a second muffler inner exhaust port 198b and a second muffler outer exhaust port 199b.

In a further example, the first muffler inner exhaust port 198a and the second muffler inner exhaust port 198b may, respectively, include a first adjustable exhaust valve 196a and a second adjustable exhaust valve 196b. In an example, the first and second adjustable exhaust valves 196a and 196b may be communicatively coupled to the controller 12 via input/output ports 108. In an example, the first and second adjustable exhaust valves 196a, 196b may be damper valves, butterfly valves, globe valves, ball valves, poppet valves, quarter turn valve, compression valve or other valve controlled by an actuator (the actuator to be discussed in more detail with respect to FIGS. 2A and 2B). In an example, the first and second adjustable exhaust valves 196a and 196b may be controlled by an operator of the motor vehicle to adjust a sound experience of the vehicle. In an example, adjusting the first and second adjustable exhaust valves 196a and 196b may adjust the sound level and/or back pressure of the exhaust system of the vehicle.

In an example, the resonator 191, mufflers 197a and 197b, outer exhaust ports 199a and 199b, and inner exhaust ports 198a and 198b may be configured and/or shaped to provide adjustable exhaust tuning, or increased and decreased exhaust sound levels, via adjustment of adjustable exhaust valves 196a and 196b.

In an example, the first and second adjustable exhaust valves 196a and 196b may be adjustable by the controller 12 in response to vehicle operating conditions including human driver input and vehicle operating mode. Vehicle operating mode may be input via a human operator via mode selector 13 (e.g., a human/machine interface). Controller 12 may adjust an angular position of the first and second adjustable exhaust valves 196a and 196b in response to vehicle operating conditions including but not limited to engine speed, engine load, distance between vehicles, engaged transmission gear, vehicle operating mode, etc. as further elaborated herein.

In another example, resonator 191 may be configured to receive exhaust gases directly from exhaust passage 148 downstream of exhaust turbine 176 and the first and second mufflers 197a, 197b may each include an emission control device 178 within the first and second mufflers 197a, 197b. In such an example post-treatment passage 193 may fluidically couple exhaust turbine 176 to resonator 191.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize some form of variable valve timing (VVT) such as one or more of cam profile switching (CPS), variable cam timing (VCT), such as twin independent variable cam timing (tiVCT), and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems.

In some embodiments, each cylinder of engine 10 may include a spark plug 192 for initiating combustion. Ignition system 190 can provide an ignition spark to combustion chamber 14 via spark plug 192 in response to spark advance signal from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing fuel. As a non-limiting example, cylinder 14 is shown including one fuel injector 166. Fuel injector 166 is shown coupled directly to cylinder 14 for injecting fuel directly therein in proportion to the pulse width of signal received from controller 12 via electronic driver 168. In this manner, fuel injector 166 provides what is known as direct injection (hereafter also referred to as "DI") of fuel into combustion cylinder 14. While FIG. 1A shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

Fuel may be delivered by the injector to the cylinder during a single cycle of the cylinder. Furthermore, for a single combustion event, multiple injections of the delivered fuel may be performed per cycle. The multiple injections may be performed during the compression stroke, intake stroke, or any appropriate combination thereof.

As described above, FIG. 1A shows one cylinder of a multi-cylinder engine. As such each cylinder may similarly include its own set of intake/exhaust valves, fuel injector(s), spark plug, etc.

Controller 12 is shown in FIG. 1A as a microcomputer, including microprocessor unit 106, input/output ports 108, an electronic storage medium for executable programs and calibration values shown as read only memory 110 in this particular example, random access memory 112, keep alive memory 114, and a data bus. Controller 12 may receive various signals from sensors coupled to engine 10, in addition to those signals previously discussed, including measurement of inducted mass air flow from mass air flow sensor 122; engine coolant temperature from temperature sensor 116 coupled to cooling sleeve 118; a profile ignition pickup signal from Hall effect sensor 120 (or other type) coupled to crankshaft 140; throttle position from a throttle position sensor; manifold absolute pressure signal from sensor 124; and knock signal from knock sensor 181. Knock sensor 181 may alternatively be located on the cylinder head or may be a sensor to detect vibrations from knock in crankshaft 140. Engine speed signal, RPM, may be generated by controller 12 from output of sensor 120. Manifold pressure from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by microprocessor unit 106 for performing the methods described below as well as other variants that are anticipated but not specifically listed. Engine 10 may be controlled at least partially by a control system 15 including controller 12. Controller 12 may receive various signals from sensors 16 coupled to engine 10, and send control signals to various actuators 81 coupled to the engine and/or vehicle. The various sensors may include, for example, various temperature, pressure, and air-fuel ratio sensors. The various actuators may include, for example, valves, throttles, and fuel injectors.

As mentioned above, sensors 16 may include any temperature, pressure, distance ranging devices, pressure, positioning, humidity or contacting sensors or any other sensors described herein. In an example, sensors 16 may include one or more microphones. Actuators 81 may include actuators used to control the first and second adjustable exhaust valves 196a, 196b. Controller 12 may be a microcomputer, including a microprocessor unit, input/output ports, an electronic storage medium for executable programs and calibration values. Controller 12 may be programmed with computer readable data representing instructions executable to perform the methods described below as well as other variants that are anticipated but not specifically listed.

For example, adjusting the first and second adjustable exhaust valves 196a, 196b may include adjusting actuators 81 coupled to adjustable exhaust valves 196a, 196b. In an example, to adjust an angle of an adjustable exhaust valve 196a or valve 196b, actuators 224a and 224b may open or close the valve by providing torque via a rotational rod connected to valve 196a along the valve rotational axis 214, further described below with respect to FIG. 2B.

Global positioning receiver 184 may receive timing signals from satellite 189 for determining a position of vehicle 1 shown in FIG. 2. Global positioning receiver 184 may send a position of vehicle 1 to vehicle navigation system 185 and/or controller 12. Navigation system 185 may reference representations of geographical maps stored in memory to determine the position of vehicle 1.

In an alternative example, navigation system 185 may be included in controller 185. Controller 12 may receive a road grade via inclinometer 17. A road grade may be expressed as an angular percentage that indicates the slope of the road that vehicle 1 is traveling. For example, vehicle 1 may be traveling at a position on a road that has a 3% grade.

Figure 1B:
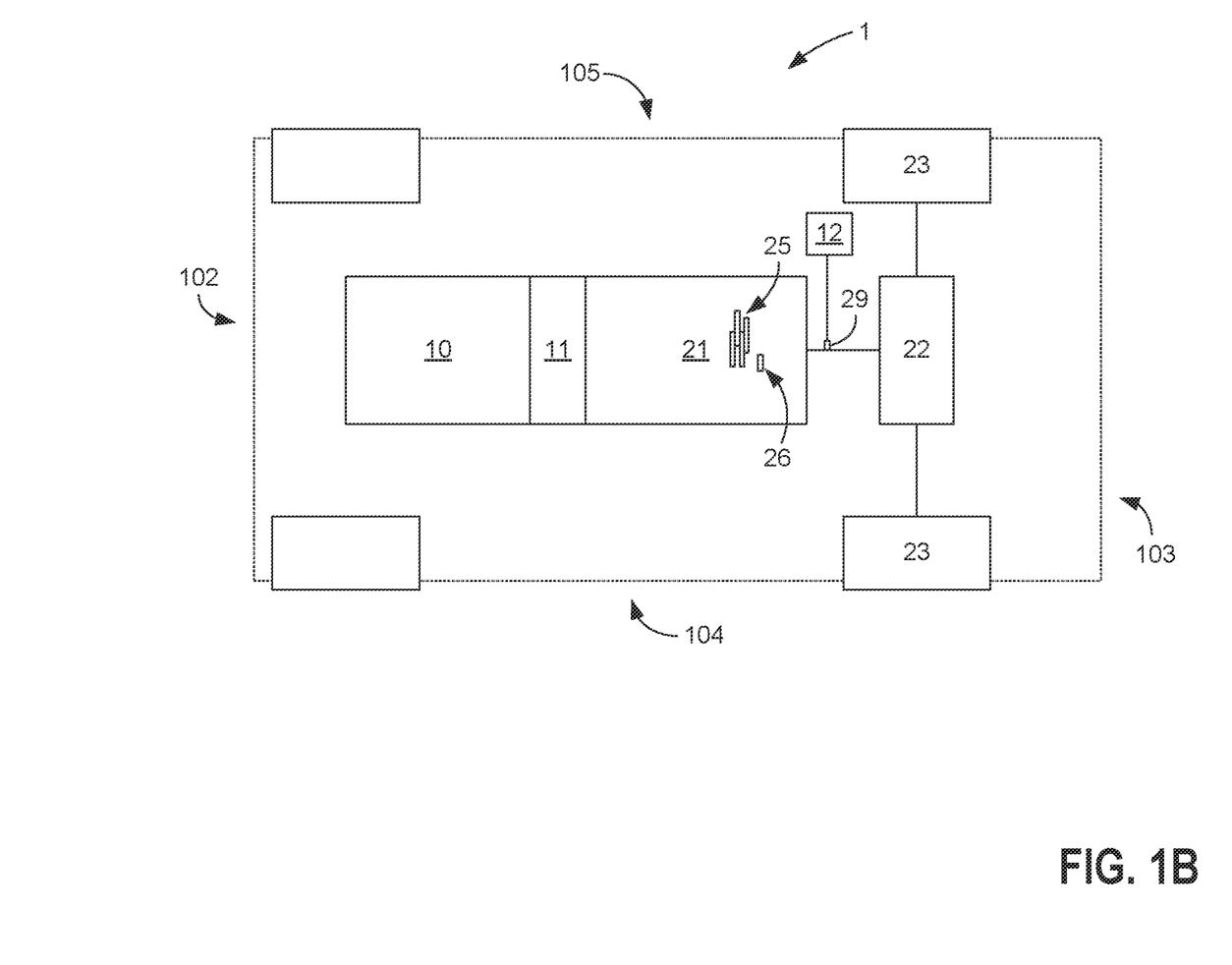
FIG. 1B shows an example vehicle driveline that includes the engine of FIG. 1A.

Referring now to FIG. 1B, vehicle 1 is shown including engine 10. Engine 10 is shown biased toward a front 102 of vehicle 1, but in some examples it may be placed biased toward rear 103 of vehicle 1. Engine 10 is also shown positioned between a first side 104 and a second side 105 of vehicle 1. Engine 10 is coupled to torque converter 11, and torque converter 11 is coupled to automatic transmission 21. Automatic transmission 21 includes a plurality of forward gears 25 and a reverse gear 26. Transmission 21 is coupled to differential 22, and differential 22 is coupled to wheels 23. Engine 10 may transmit torque to torque converter 11. Torque converter 11 dampens torque oscillations from engine 10 and it delivers torque to transmission 21. Wheels 23 may rotate and propel vehicle 1 when torque is provided to wheels 23 via transmission 21 and differential 22. Vehicle speed may be determined by controller 12 according to output of speed/position sensor 29. It should be noted that this is only one example vehicle driveline configuration that may take advantage of the present method. Accordingly, the method described herein may be applied to other vehicle drivelines including front wheel drive, four wheel drive, and hybrid vehicles.

Figures 2A, 2B:
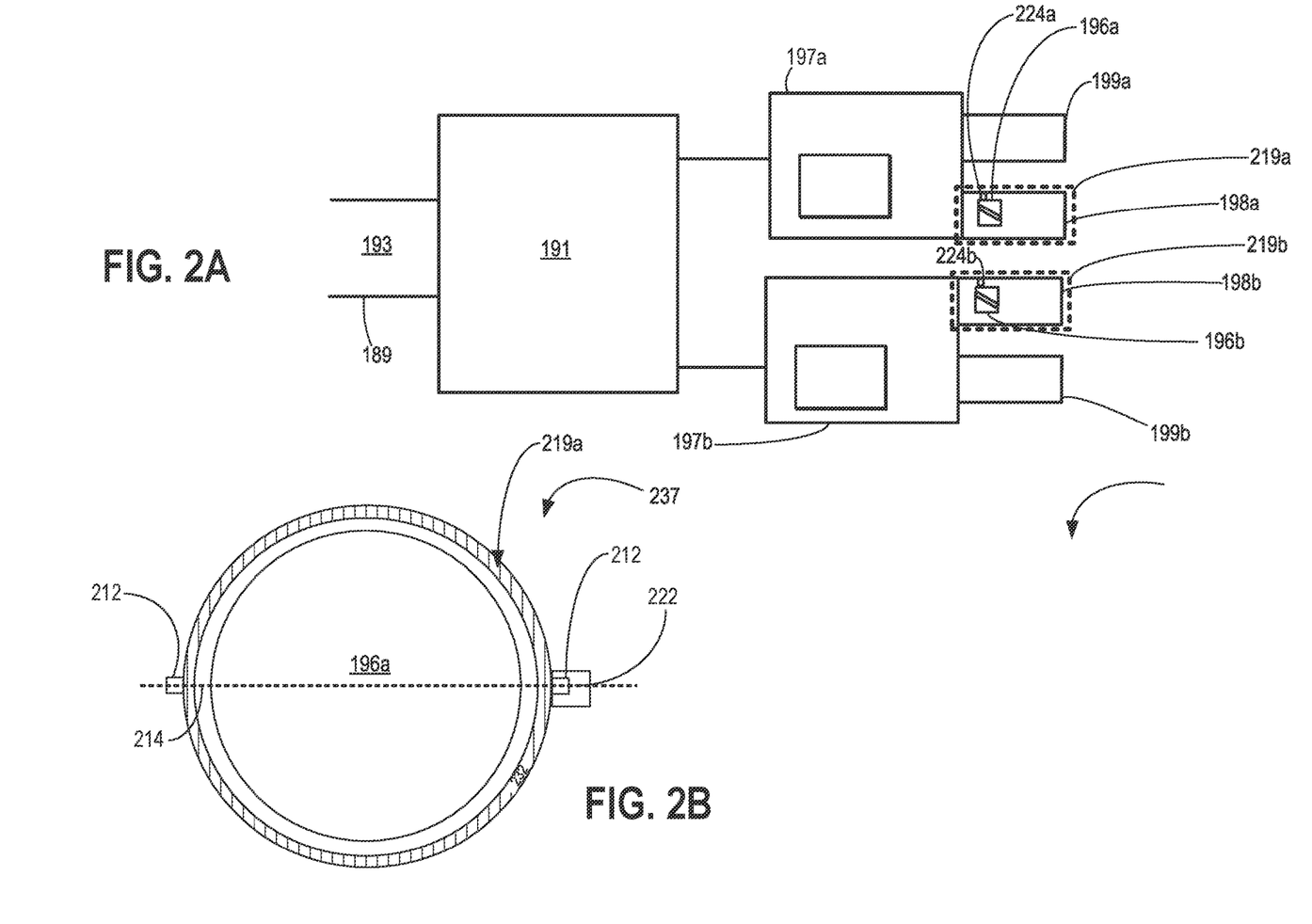
FIG. 2A shows detailed view of an example variable exhaust tuning system.
FIG. 2B shows an upstream-looking point of view of an exhaust valve from the downstream end of the exhaust valve.

FIG. 2A shows a detailed example view of the exhaust system 177 that includes one or more tunable exhaust valves 196a, 196b. In an example, exhaust valve 196a and 196b may be positioned within first and second sleeves 219a and 219b. In an example, 219a and 219b may be laid over and around 198a or 198b and in another example, 219a and 219b may entirely replace 198a and 198b. In another example, the first and second heat exchanger sleeves 219a and 219b may cover a portion of the total external surface area of the first and second inner exhaust ports 198a and 198b. In an example, the portion of the total external surface area of the first and second inner exhaust ports 198a and 198b may be centered on the adjustable exhaust valves 196a and 196b. In an example, the portion of the total external surface area of the first and second inner exhaust ports 198a and 198b may be centered upon the operating area of the adjustable exhaust valves 196a and 196b. In a further example, the portion of the total external surface area of the first and second inner exhaust ports 198a and 198b which is covered by the first and second heat exchanger sleeves 219a and 219b may be the operating area of the adjustable exhaust valves 196a and 196b.

In an example, the variable exhaust tuning system may comprise a plurality of actuators 81. In an example, adjustable exhaust valves 196a and 196b may be respectively adjusted by a first valve actuator 224a and a second valve actuator 224b. In an example, the adjustable exhaust valves 196a, 196b may have an exhaust port length, comprising an upstream-downstream length of an operating area of the adjustable exhaust valves 196a and 196b. In an example, the operating area of the adjustable exhaust valves 196a and 196b may include an upstream-downstream length of the space the adjustable exhaust valves 196a and 196b occupy and/or use.

First and second valve actuators 224a, 224b may be communicatively coupled to controller 12. In an example, control system may include controller 12 which may receive signals from the sensors 16 and employ actuators 81 to adjust engine operation and/or variable exhaust tuning system operation based on the received signals and instructions stored on a memory of the controller further described herein.

FIG. 2B shows a cross-section 237 of an inner exhaust port 198a or 198b equipped with a sleeve 219a or 219b. The cross-section 237 shows an upstream-looking point of view from the downstream end of either a first or second muffler inner exhaust port 198a or 198b, and in such an example, either adjustable exhaust valves 196a or 196b may comprise a butterfly, damper, quarter turn, or compression valve. In some cases, the positioning of adjustable exhaust valves 196a and 196b may be adjusted by adjustable exhaust valve actuators 224a and 224b which may be represented in FIG. 2B by actuator 222. Actuator 222 may, in an example, adjust the position or rotation angle of valve 196a along a valve rotational axis 214, wherein the rotational axis includes a rotational rod in order to provide turning of the valve 196a via actuator 222. In an example, the rotational rod of valve rotational axis 214 may be attached to and passing through valve 196a or it may be built into valve 196a as a single body.

In an example, first or second inner exhaust ports 198a or 198b may additionally include the sleeve 219a, and sleeve 219a covers valve 196a. Valve 196a may be opened so that exhaust gases may at least partially bypass muffler 197a, thereby increasing engine exhaust noise. The exhaust system 177 may also include one or more valve positioning sensors 212 which may be positioned along the valve rotational axis 214 of the valve 196a and they may also be attached to the rotational rod running along valve rotational axis 214. In an example, valve positioning sensors 212 may provide continuous indication of valve 196a position. In addition, valve positioning sensors 212 may be communicatively coupled to controller 12 via input/output ports 108. In an example, valve positioning sensor 212 may be included within actuator 222.

Thus, the system of FIGS. 1A-2B provides for a vehicle system, comprising: an engine; an exhaust system coupled to the engine, the exhaust system including a valve positioned downstream of an emissions control device; a range sensing device; and a controller including executable instructions stored in non-transitory memory that cause the controller to adjust a position of the valve in response to an output of the range sensing device. The vehicle system includes where the output indicates a distance between a first vehicle that includes the valve and a second vehicle. The vehicle system includes where the range sensing device indicates a distance from a front of the first vehicle to a rear of the second vehicle. The vehicle system includes where the range sensing device indicates a distance from a rear of the first vehicle to a front of the second vehicle. The vehicle system includes where the range sensing device indicates a distance from a side of the first vehicle to a side of the second vehicle. The vehicle system includes where adjusting the position of the valve includes closing the valve in response to the first vehicle being within a threshold distance of the second vehicle. The vehicle system includes where the threshold distance is a function of a speed of the first vehicle.

Figure 3A:
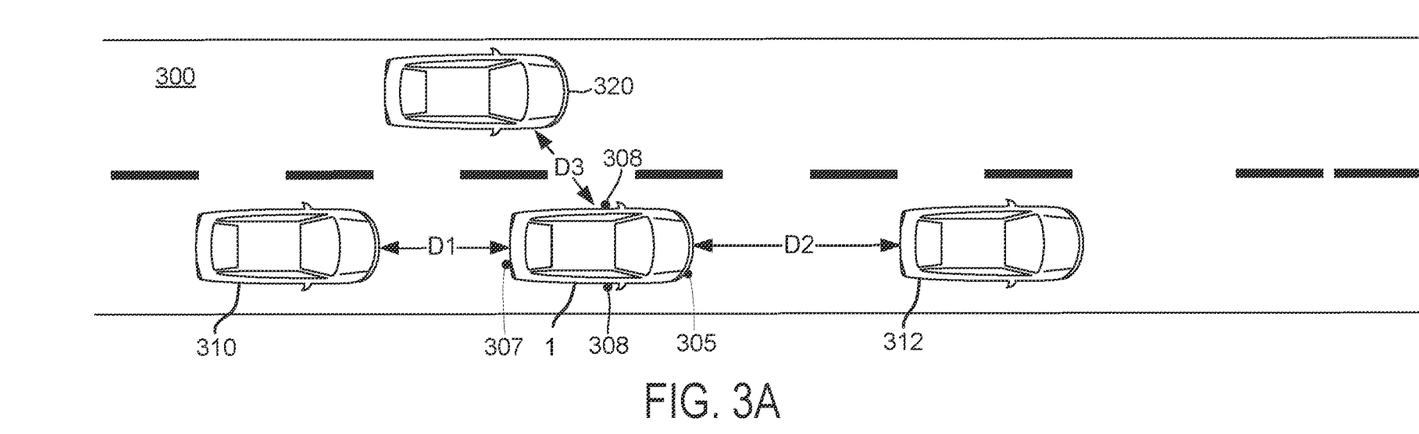
FIG. 3A shows example distance measurements for adjusting a position of an exhaust valve.

Turning now to FIG. 3A, a sketch illustrating distances between a vehicle 1 having a tunable exhaust valve and other vehicles is shown. Vehicle 1 (also shown in FIG. 1B) is shown traveling on road 300. In this example, road 300 is a divided highway that includes two parallel lanes on which vehicles may travel in a same direction. A second vehicle 310 is shown trailing vehicle 1 and a third vehicle 312 is shown leading or preceding vehicle 1. A fourth vehicle 320 is shown alongside of vehicle 1. The distance between vehicle 1 and the trailing vehicle 310 is indicated as D1. The distance between vehicle 1 and the leading vehicle 312 is indicated as D2. Finally, a distance between vehicle 1 and vehicle 320 is indicated as D3. Distance D1 may be determined by range sensing sensors 307 (e.g., RADAR (radio detection and ranging), SONAR (sound navigation and ranging, LIDAR (light detection and ranging), etc.) that may sense a distance between vehicle 1 and trailing vehicles (e.g., 310). Likewise, distance D2 may be determined by range sensing sensors 305 that may sense a distance between vehicle 1 and leading vehicles (e.g., 312). Side range sensors 308 may sense a distance D3 between vehicle 1 and vehicles traveling alongside of vehicle 1 (e.g., vehicle 320).

Figure 3B:
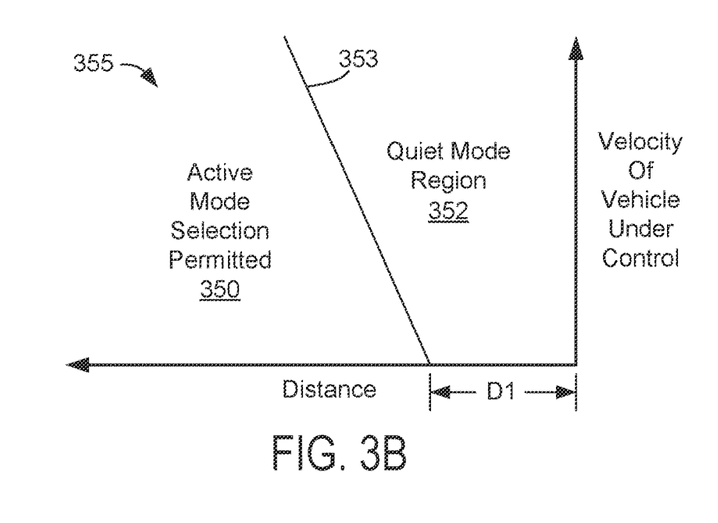
FIGS. 3B and 3C show example functions for adjusting a position of an exhaust valve.

Referring now to FIG. 3B, a plot showing how a position of a valve in an exhaust system of a vehicle may be adjusted responsive to a distance D1 to a trailing vehicle 310 is shown. Plot 355 shows a relationship between a distance between the vehicle having the tunable valve in its exhaust system and a trailing vehicle versus a velocity of the vehicle under control (e.g., the vehicle having the tunable valve in its exhaust system). In particular, line 353 bisects the plot into a first region 350 and a second region 352. If the distance between the vehicle having the tunable valve in its exhaust system and the trailing vehicle is in second region 352, then the vehicle's exhaust valve may be positioned to follow a position specified by a quiet mode map. Or alternatively, the opening amount of the valve in the exhaust system may be attenuated or reduced a specified amount to quiet the exhaust. Conversely, if the distance between the vehicle having the tunable valve in its exhaust system and the trailing vehicle is in first region 350, then the vehicle's exhaust valve may be positioned to follow a position specified by a selected map that may or not include the quiet mode map. For example, if the distance between vehicle 1 and vehicle 310 is to the left of line 353 and the vehicle is operating in a "sport" mode, then the position of the valve in the exhaust system may continue to follow a position defined in a "sport" mode map. In one example, the equation of line 353 may be expressed as: $d=(v \cdot th)+D1$, where d is the distance between the vehicle having the valve in its exhaust system and the trailing vehicle, v is the velocity of the vehicle having the valve in its exhaust system, th is a time headway real number that may be set by the vehicle's operator, and D1 is a distance between the vehicles when a speed of the vehicle having the valve in its exhaust system is zero. Of course, in other examples, valve position may be adjusted according to a different relationship between vehicle velocity and distance between the vehicles.

Figure 3C:
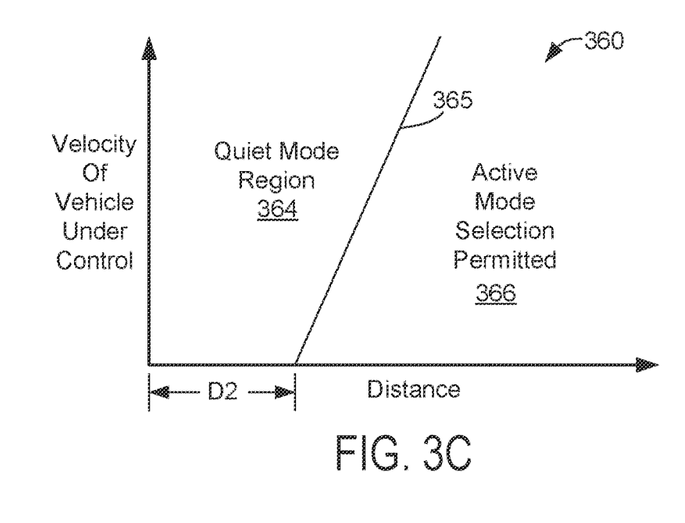

Referring now to FIG. 3C, a plot showing how a position of a valve in an exhaust system of a vehicle may be adjusted responsive to a distance D2 to a leading vehicle 312 is shown. Plot 360 shows a relationship between a distance between the vehicle having the tunable valve in its exhaust system and a leading or preceding vehicle versus a velocity of the vehicle under control (e.g., the vehicle having the tunable valve in its exhaust system). Specifically, line 365 bisects the plot into a first region 366 and a second region 364. If the distance between the vehicle having the tunable valve in its exhaust system and the trailing vehicle is in second region 364, then the vehicle's exhaust valve may be positioned to follow a position specified by a quiet mode map. Or alternatively, the opening amount of the valve in the exhaust system may be attenuated or reduced a specified amount to quiet the exhaust. Conversely, if the distance between the vehicle having the tunable valve in its exhaust system and the leading vehicle is in first region 366, then the vehicle's exhaust valve may be positioned to follow a position specified by a selected map that may or not include the quiet mode map. For example, if the distance between vehicle 1 and vehicle 312 is to the right of line 365 and the vehicle is operating in a "sport" mode, then the position of the valve in the exhaust system may continue to follow a position defined in a "sport" mode map. In one example, the equation of line 353 may be expressed as: $d=(v \cdot th)+D2$, where d is the distance between the vehicle having the valve in its exhaust system and the leading vehicle, v is the velocity of the vehicle having the valve in its exhaust system, th is a time headway real number that may be set by the vehicle's operator, and D2 is a distance between the vehicles when a speed of the vehicle having the valve in its exhaust system is zero. Of course, in other examples, valve position may be adjusted according to a different relationship between vehicle velocity and distance between the vehicles.

Figure 4:
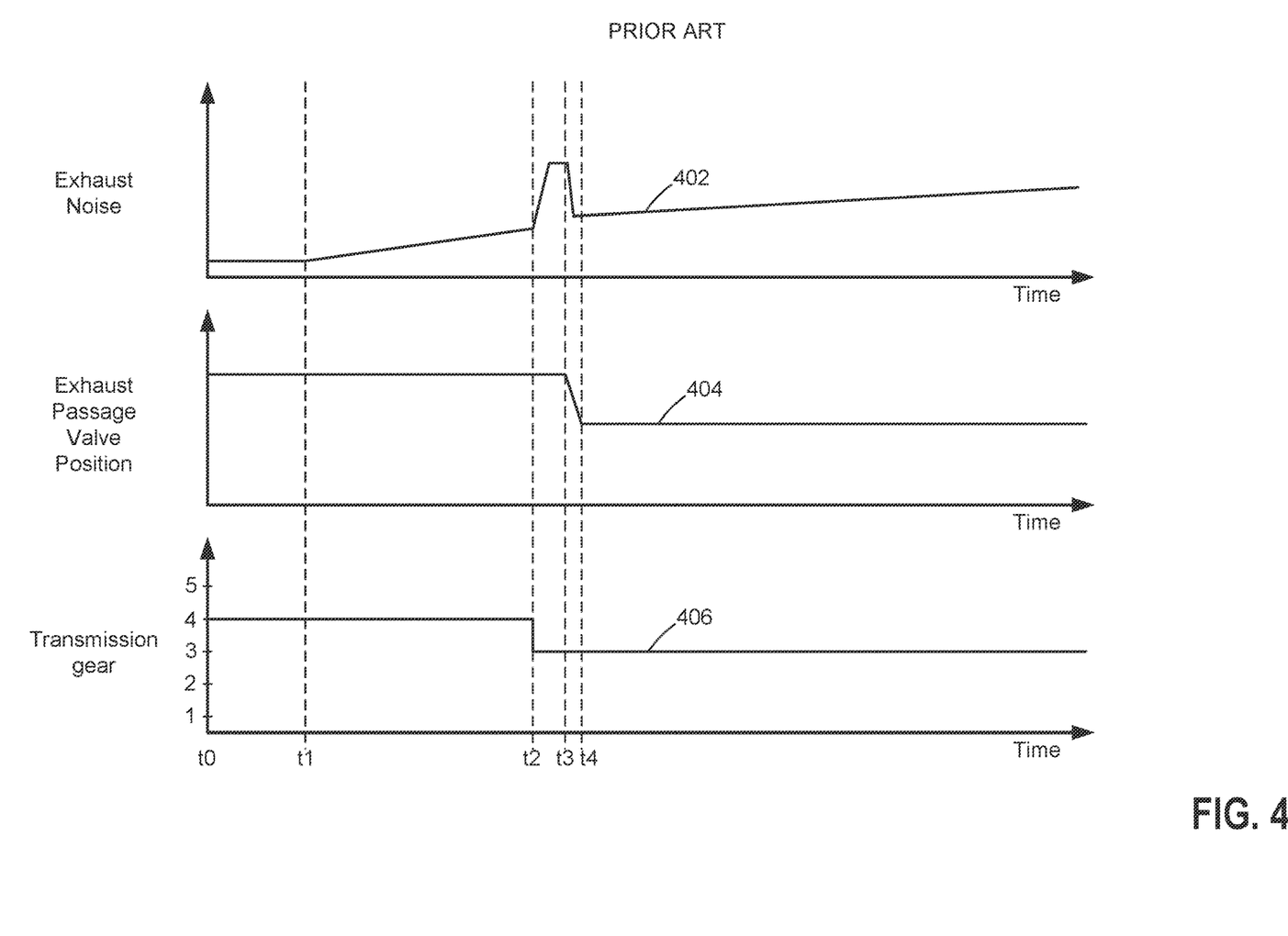
FIG. 4 shows a prior art exhaust valve position changing sequence.

Referring now to FIG. 4, a prophetic prior art exhaust valve adjustment procedure is shown. The plots occur at the same time and they are aligned in time. The vertical lines at times t0-t4 represents times of interest during the sequence.

The first plot from the top of FIG. 4 is a plot of engine exhaust system noise level (e.g., decibels) versus time. The engine exhaust system noise level increases in the direction of the vertical axis arrow. The horizontal axis represents time and time increases from the left side of the plot to the right side of the plot. Trace 402 represents an engine noise level.

The second plot from the top of FIG. 4 is a plot of engine exhaust valve opening amount or position versus time. The engine exhaust valve opening amount or position increases in the direction of the vertical axis arrow. The horizontal axis represents time and time increases from the left side of the plot to the right side of the plot. Trace 404 represents an opening amount of an exhaust valve (e.g., 196a).

The third plot from the top of FIG. 4 is a plot of transmission gear versus time. The transmission gear that is engaged is indicated via the numbering along the vertical axis. The horizontal axis represents time and time increases from the left side of the plot to the right side of the plot. Trace 406 indicates which gear of the transmission is presently engaged.

At time t0, the exhaust noise level is low and the exhaust valve position is open a large amount while a vehicle (not shown) transmission is engaged in fourth gear. Such conditions may be present when a vehicle is cruising at highway speed.

At time t1, a propulsive effort pedal (not shown) is applied and vehicle speed begins increasing (not shown). The exhaust valve position remains unchanged and the transmission is still engaged in fourth gear. The exhaust noise increases as a human driver applies the propulsive pedal. By increasing the position of the propulsive effort pedal, the driver increases the engine load.

At time t2, the transmission is downshifted from fourth gear to third gear based on engine load or driver demand torque and engine speed. The exhaust noise increases in response to the downshift since downshifting the transmission increases engine speed (not shown). The position of the exhaust valve is unchanged, so an increase of engine noise caused by the transmission gear downshift is indicated by the increase in exhaust noise.

At time t3, the exhaust valve controller reacts to the transmission downshift, which increases engine speed while engine load is elevated (not shown). Specifically, the exhaust valve controller reduces the exhaust valve opening amount in response to the change in engine speed that was caused by the transmission gear downshift. The exhaust noise remains at a high level at this time.

Between time t3 and time t4, the exhaust noise level is reduced by closing the exhaust valve. Closing the exhaust valve prevents exhaust gases from bypassing the muffler so exhaust noise is reduced via the muffler.

At time t4, the exhaust valve is closed to a requested level and the engine noise level is reduced. The transmission gear remains in fourth gear. The exhaust noise increases at a low rate after time t4 as the driver increases engine load (not shown) to maintain vehicle speed (not shown).

Figure 5:
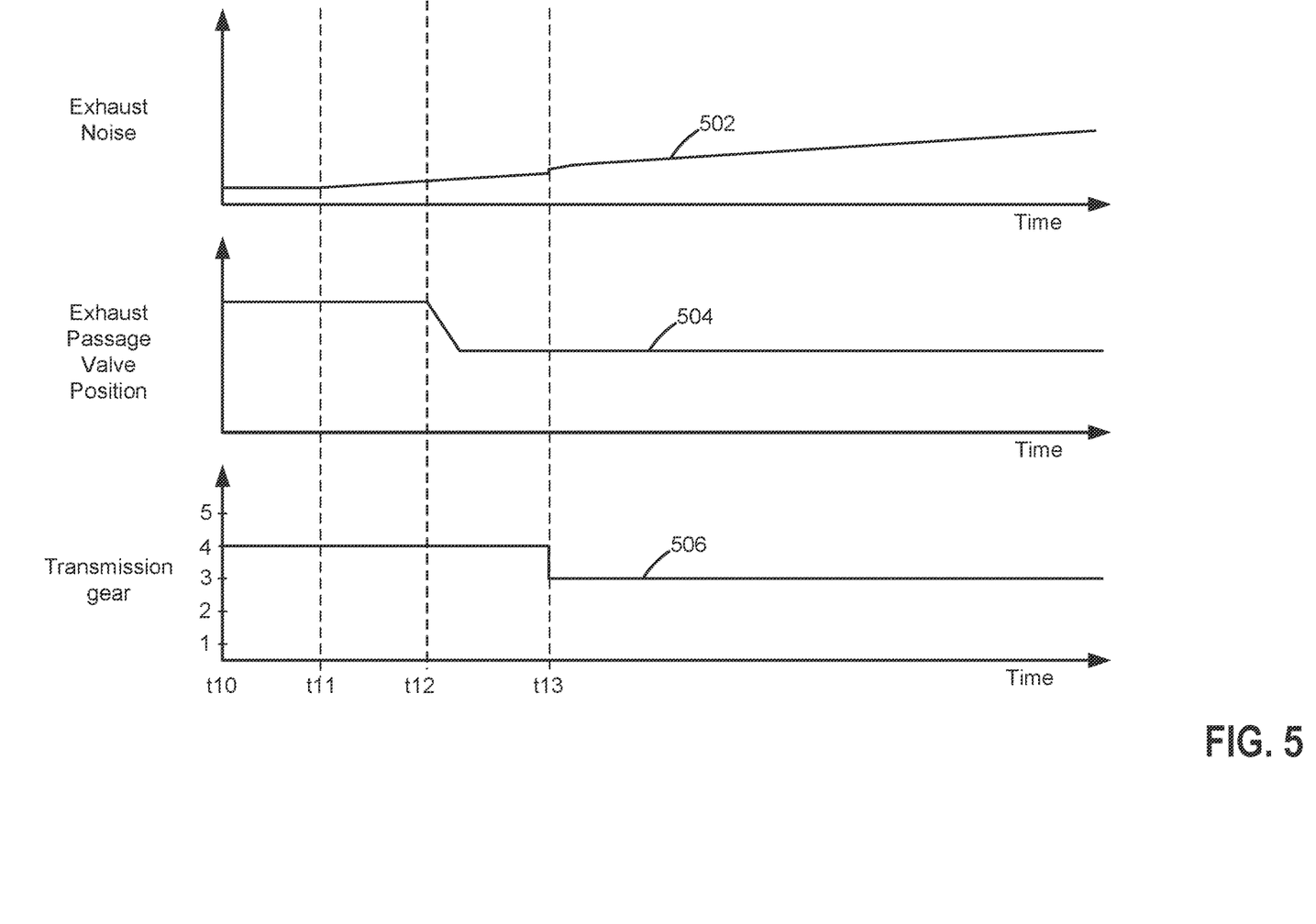
FIG. 5 shows an exhaust valve position changing sequence according to the present method.

Referring now to FIG. 5, a prophetic exhaust valve adjustment procedure according to the present description is shown. The plots occur at the same time and they are aligned in time. The vertical lines at times t10-t14 represents times of interest during the sequence. The sequence of FIG. 5 is identical to the sequence of FIG. 5 except for the exhaust valve shown in FIG. 5 is adjusted according to a distance between a vehicle having the valve in its exhaust system and a leading or preceding vehicle.

The first plot from the top of FIG. 5 is a plot of engine exhaust system noise level (e.g., decibels) versus time. The engine exhaust system noise level increases in the direction of the vertical axis arrow. The horizontal axis represents time and time increases from the left side of the plot to the right side of the plot. Trace 502 represents an engine noise level. The exhaust noise magnitude of the vertical axis in the first plot from the top of FIG. 5 is equal to the exhaust noise magnitude of the vertical axis in the first plot from the top of FIG. 4.

The second plot from the top of FIG. 5 is a plot of engine exhaust valve opening amount or position versus time. The engine exhaust valve opening amount or position increases in the direction of the vertical axis arrow. The horizontal axis represents time and time increases from the left side of the plot to the right side of the plot. Trace 504 represents an opening amount of an exhaust valve (e.g., 196a). The exhaust valve position magnitude of the vertical axis in the second plot from the top of FIG. 5 is equal to the exhaust valve position magnitude of the vertical axis in the second plot from the top of FIG. 4.

The third plot from the top of FIG. 5 is a plot of transmission gear versus time. The transmission gear that is engaged is indicated via the numbering along the vertical axis. The horizontal axis represents time and time increases from the left side of the plot to the right side of the plot. Trace 506 indicates which gear of the transmission is presently engaged.

At time t10, the exhaust noise level is low and the exhaust valve position is open a large amount while a vehicle (not shown) transmission is engaged in fourth gear. Such conditions may be present when a vehicle is cruising at highway speed in "sport" mode.

At time t11, a propulsive effort pedal is applied and the vehicle speed begins to increase. The exhaust valve position is unchanged in response to the change in propulsive effort. The transmission gear is also unchanged. The engine noise level begins to increase as the positon of the propulsive effort pedal increases.

At time t12, the vehicle having the exhaust valve moves to within a threshold distance of a leading or preceding vehicle (not shown). Consequently, the valve's position is adjusted to reduce the exhaust opening amount of an exhaust passage, thereby beginning to reduce a noise level of the vehicle's exhaust. The transmission gear is unchanged and exhaust noise is increasing at a slow rate. The exhaust valve is closed to a desired level shortly after time t12.

At time t13, the transmission is downshifted from fourth gear to third gear based on engine load or driver demand torque and engine speed. The exhaust noise increases a small amount in response to the downshift since downshifting the transmission increases engine speed (not shown). However, the level of exhaust noise increase is substantially lower than the level that is shown in FIG. 4. The position of the exhaust valve remains at a reduced opening amount.

In this way, bursts of exhaust noise due to transmission downshifting may be reduced when vehicles a proximate to a vehicle having a tunable valve in its exhaust system. Thus, the distance between vehicles may provide an early indication to reduce exhaust noise to that there may be less possibility of distracting other vehicles as a vehicle with a tunable valve in its exhaust system approaches.

Figure 6A:
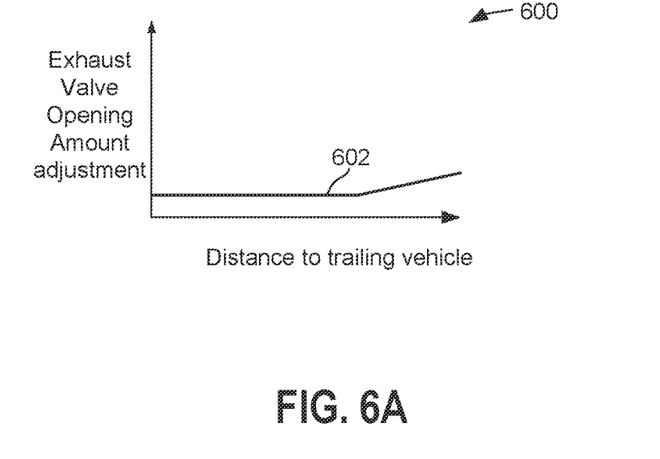
FIGS. 6A-6C show example maps for adjusting exhaust valve position.

Referring now to FIG. 6A, an example map 600 showing an exhaust valve opening amount adjustment that is based on a distance amount to trailing vehicle when a vehicle is operated in a "quiet" mode is shown. In this example, the vertical axis represents an exhaust valve opening amount adjustment and the exhaust valve opening amount adjustment increases in the direction of the vertical axis arrow. The exhaust valve opening amount adjustment is zero at the level of the horizontal axis. The horizontal axis represents an amount of distance to a trailing vehicle and the trailing distance increases in the direction of the horizontal axis arrow. Line 602 represents the relationship between exhaust valve opening amount adjustment and distance to a trailing vehicle when a vehicle with a valve in its exhaust system is operating in a "quiet" mode.

Thus, it may be observed that the exhaust valve opening amount adjustment increases as distance increases; however, the exhaust valve opening amount adjustment is rather small even at farther distances so that engine exhaust noise may be low. In one example, the position of the valve in the exhaust system may be adjusted with to outputs of other maps or functions that collectively determine the opening amount of the valve in the exhaust system. For example, the exhaust valve opening amount may be a function of engine speed and engine load for a particulate mode of operation (e.g., quiet, baseline, sport, or track modes) and the exhaust valve opening amount may increase when the exhaust valve opening amount adjustment output from map 600 increases. Thus, the exhaust valve opening amount may be described as a function of several parameters (e.g., exhaust valve position=f(N,L)+f1(vehicle mode, distance to trailing vehicle), where f and f1 are functions that return values that generate the exhaust valve position, N is engine speed, and L is engine load).

Figure 6B:
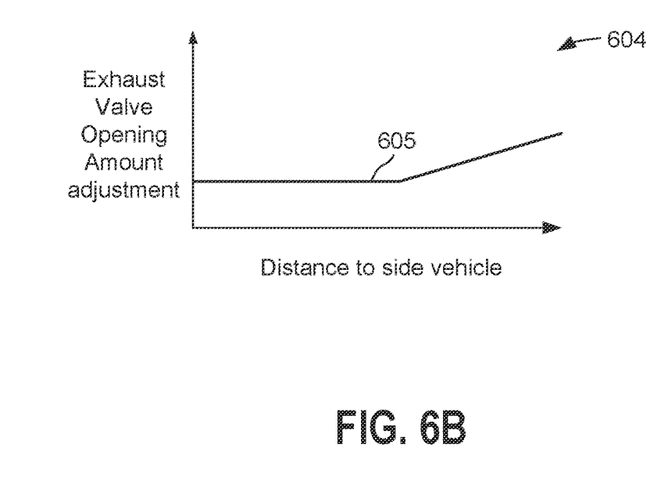

Referring now to FIG. 6B, an example map 604 showing an exhaust valve opening amount adjustment that is based on distance to a vehicle on a side of the vehicle with the valve in its exhaust system when a vehicle is operated in a "base" mode is shown. In this example, the vertical axis represents an exhaust valve opening amount adjustment and the exhaust valve opening amount adjustment increases in the direction of the vertical axis arrow. The exhaust valve opening amount adjustment is zero at the level of the horizontal axis. The horizontal axis represents an amount of distance to a side vehicle and the distance increases in the direction of the horizontal axis arrow. Line 605 represents the relationship between exhaust valve opening amount adjustment and distance to a side vehicle when a vehicle is operating in a "base" mode. Thus, it may be observed that the exhaust valve opening amount adjustment increases as distance to a side vehicle increases.

Figure 6C:
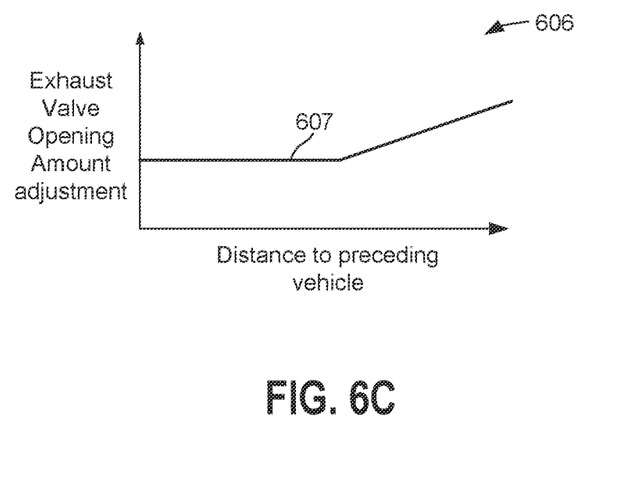

Referring now to FIG. 6C, an example map 606 showing an exhaust valve opening amount adjustment that is based on distance to a preceding vehicle when a vehicle is operated in a "sport" mode is shown. In this example, the vertical axis represents an exhaust valve opening amount adjustment and the exhaust valve opening amount adjustment increases in the direction of the vertical axis arrow. The exhaust valve opening amount adjustment is zero at the level of the horizontal axis. The horizontal axis represents an amount of distance from a vehicle having the valve in its exhaust system and a preceding vehicle and the valve opening amount increases in the direction of the horizontal axis arrow. Line 607 represents the relationship between exhaust valve opening amount adjustment and distance to the preceding vehicle when a vehicle is operating in a "sport" mode. Thus, it may be observed that the exhaust valve opening amount is always greater than zero and it increases as distance to the preceding vehicle increases. In addition, the exhaust valve opening amount adjustment increases for a given distance to a vehicle is greater in map 606 than in map 604. A similar map may be generated for when the vehicle operates in "track" mode; however, the exhaust valve opening amount adjustment may be a larger constant value for "track" mode.

Values in maps 600, 604, and 606 may be empirically determined via operating a vehicle on a road and adjusting the exhaust valve opening amount adjustment as a function of a distance to other vehicles. In one example, the exhaust valve opening amount is adjusted so that the exhaust valve has time to be repositioned before overtaking another vehicle. In addition, it should be appreciated that maps 600, 604, and 606 are exemplary in nature and exhaust valve position may be determined as a function of other control parameters.

Figure 7:
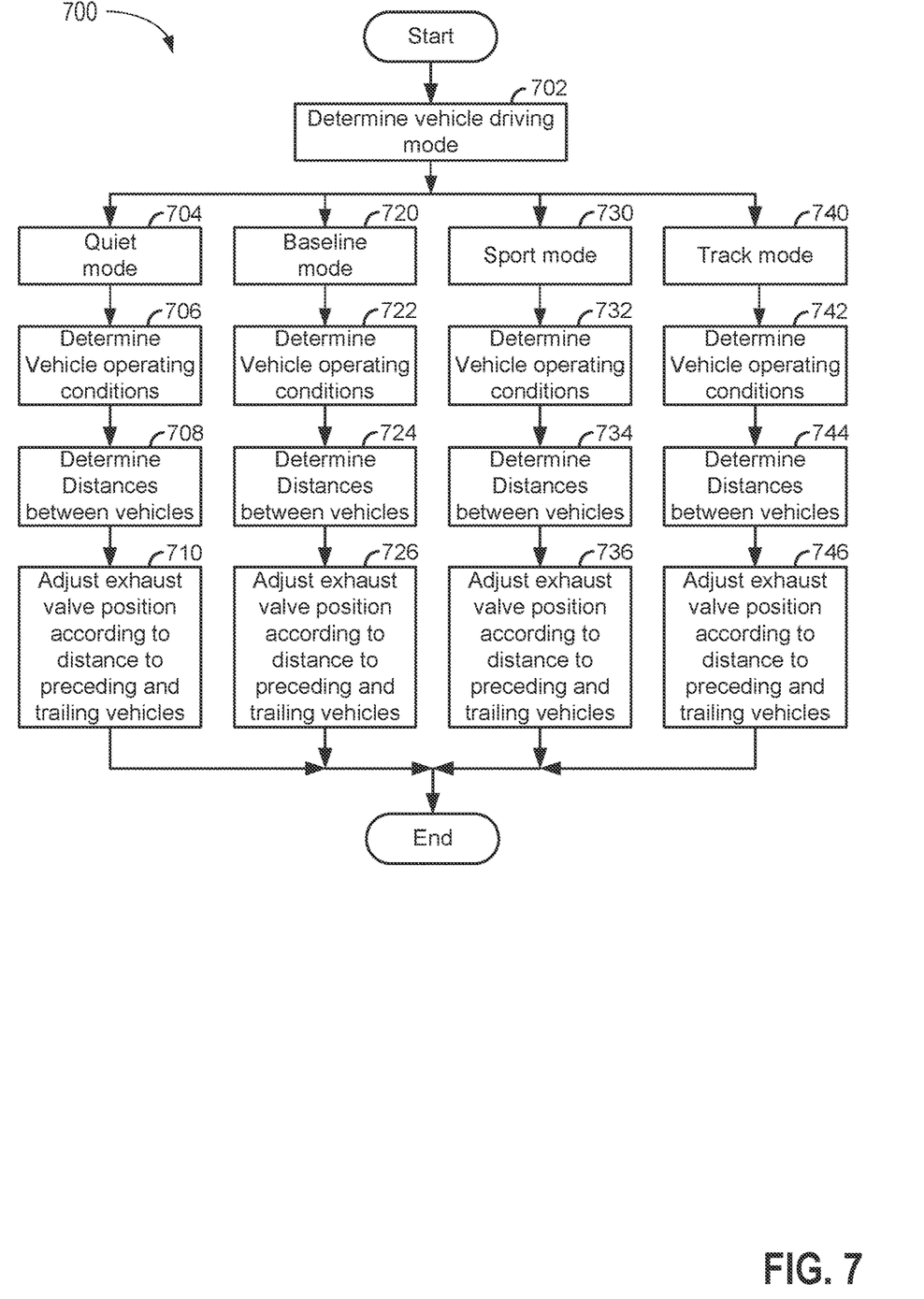
FIG. 7 shows a flowchart representing an exemplary method for adjusting a position of an exhaust valve.

Referring now to FIG. 7, a method for operating an engine and an exhaust system is shown. The method of FIG. 7 may be performed when an engine is combusting fuel and rotating. The engine may be included in a vehicle and the vehicle may be traveling on a road. At least portions of method 700 may be implemented as executable controller instructions stored in non-transitory memory. Method 700 may operate in cooperation with the system of FIGS. 1A-2B. Additionally, portions of method 700 may be actions taken in the physical world to transform an operating state of an actuator or device. The method of FIG. 7 may be incorporated into the system of FIGS. 1A-2B as executable instructions stored in non-transitory memory. The method of FIG. 7 may be applied to one or more exhaust valves.

At 702, method 700 determines the vehicle driving mode. In one example, method 700 may determine the vehicle driving mode from a human/machine interface. The vehicle driving modes may include but are not limited to "quiet," "base," "sport," and "track." In "quiet" mode, the engine exhaust noise may be reduced substantially. In "base" mode, the engine exhaust noise may be greater than in "quiet" mode. In "sport" mode, the engine exhaust noise may be greater than in "base" mode and engine and vehicle suspension settings may be adjusted to improve engine and suspension performance as compared to in "base" mode. In "track" mode, the engine exhaust noise may be greater than in "sport" mode and engine and vehicle suspension settings may be adjusted to improve engine and suspension performance as compared to in "sport" mode. Method 700 proceeds to 704 if method 700 judges that the vehicle mode is "quiet." Method 700 proceeds to 720 if method 700 judges that the vehicle mode is "base." Method 700 proceeds to 730 if method 6700 judges that the vehicle mode is "sport." Method 700 proceeds to 740 if method 700 judges that the vehicle mode is "track."

At 704, method 700 enters "quiet" mode and the position of the exhaust valve is adjusted based on being in "quiet" mode. Method 700 may also adjust engine control parameters and suspension control parameters for operating in "quiet" mode. For example, method 700 may retard spark timing to smooth engine torque and reduce engine noise as compared to when the vehicle is operated in "base" mode. Method 700 proceeds to 706.

At 706, method 700 determines vehicle operating conditions. Vehicle operating conditions may include but are not limited to engine speed, engine load, vehicle speed, vehicle geographical position, presently engaged transmission gear, and ambient temperature. Method 700 proceeds to 708 after determining vehicle operating conditions.

At 708, method 700 determines distances to preceding, trailing, and side vehicles, if present. The distances may be determined via ranging sensors as previously described. Method 700 proceeds to 710.

At 710, method 700 adjusts a position of an exhaust valve (e.g., 196a and/or 196b) according to the distance between the vehicle having the valve in its exhaust system and preceding, trailing, and side vehicles. In one example, the position of the exhaust valve is adjusted according to an exhaust valve opening amount adjustment value that is a function of distance between the vehicles. The exhaust valve opening amount adjustment value may be combined with other exhaust valve opening amount adjustment values that are based on engine speed, engine load, and other control parameters.

The exhaust valve opening amount adjustment values may be stored in maps or tables as shown in FIGS. 6A-6C. The maps include a map for "quiet" mode and the "quiet" mode map may be referenced via distances between the vehicle having the valve in its exhaust system and other vehicles (e.g., preceding, trailing, and side vehicles). The map for "quiet" mode is referenced according to the distances between the vehicles and the "quiet" mode map outputs an exhaust valve opening amount adjustment value. Method 700 adjusts the position of the exhaust valve in response to exhaust valve opening amount adjustment value that is based on distances between the vehicles and "quiet" mode. In addition, method 700 adjusts the position of the exhaust valve according to other control parameters (e.g., engine speed and engine load). Method 700 proceeds to exit.

At 720, method 700 enters "base" mode and the position of the exhaust valve is adjusted based on being in "base" mode. Method 700 may also adjust engine control parameters and suspension control parameters for operating in "base" mode. For example, method 700 may operate at a nominal spark timing to improve engine fuel economy as compared to when the vehicle is operated in "quiet" mode. Method 700 proceeds to 722.

At 722, method 700 determines vehicle operating conditions. Vehicle operating conditions may include but are not limited to engine speed, engine load, vehicle speed, vehicle geographical position, presently engaged transmission gear, and ambient temperature. Method 700 proceeds to 724 after determining vehicle operating conditions.

At 724, method 700 determines distances to preceding, trailing, and side vehicles, if present. The distances may be determined via ranging sensors as previously described. Method 700 proceeds to 726.

At 726, method 700 adjusts a position of an exhaust valve (e.g., 196a and/or 196b) according to the distance between the vehicle having the valve in its exhaust system and preceding, trailing, and side vehicles. In one example, the position of the exhaust valve is adjusted according to an exhaust valve opening amount adjustment value that is a function of distance between the vehicles. The exhaust valve opening amount adjustment value may be combined with other exhaust valve opening amount adjustment values that are based on engine speed, engine load, and other control parameters.

The exhaust valve opening amount adjustment values may be stored in maps or tables as shown in FIGS. 6A-6C. The maps include a map for "base" mode and the "base" mode map may be referenced via distances between the vehicle having the valve in its exhaust system and other vehicles (e.g., preceding, trailing, and side vehicles). The map for "base" mode is referenced according to the distances between vehicles and the "base" mode map outputs an exhaust valve opening amount adjustment value. Method 700 adjusts the position of the exhaust valve in response to exhaust valve opening amount adjustment value that is based on distances between the vehicles and "base" mode. In addition, method 700 adjusts the position of the exhaust valve according to other control parameters (e.g., engine speed and engine load). Method 700 proceeds to exit.

At 730, method 6700 enters "sport" mode and the position of the exhaust valve is adjusted based on being in "sport" mode. Method 700 may also adjust engine control parameters and suspension control parameters for operating in "sport" mode. For example, method 700 may operate at an advanced spark timing to improve engine fuel economy as compared to when the vehicle is operated in "base" mode. Method 700 proceeds to 732.

At 732, method 700 determines vehicle operating conditions. Vehicle operating conditions may include but are not limited to engine speed, engine load, vehicle speed, vehicle geographical position, presently engaged transmission gear, and ambient temperature. Method 700 proceeds to 734 after determining vehicle operating conditions.

At 734, method 700 determines distances to preceding, trailing, and side vehicles, if present. The distances may be determined via ranging sensors as previously described. Method 700 proceeds to 726.

At 736, method 700 adjusts a position of an exhaust valve (e.g., 196a and/or 196b) according to the distance between the vehicle having the valve in its exhaust system and preceding, trailing, and side vehicles. In one example, the position of the exhaust valve is adjusted according to an exhaust valve opening amount adjustment value that is a function of distance between the vehicles. The exhaust valve opening amount adjustment value may be combined with other exhaust valve opening amount adjustment values that are based on engine speed, engine load, and other control parameters.

The exhaust valve opening amount adjustment values may be stored in maps or tables as shown in FIGS. 6A-6C. The maps include a map for "sport" mode and the "sport" mode map may be referenced via the distances between the vehicles. The map for "sport" mode is referenced via distances between the vehicle having the valve in its exhaust system and other vehicles (e.g., preceding, trailing, and side vehicles) and the "sport" mode map outputs an exhaust valve opening amount adjustment value. Method 700 adjusts the position of the exhaust valve in response to exhaust valve opening amount adjustment value that is based on based on distances between the vehicles and "sport" mode. In addition, method 600 adjusts the position of the exhaust valve according to other control parameters (e.g., engine speed and engine load). Method 700 proceeds to exit.

At 740, method 700 enters "track" mode and the position of the exhaust valve is adjusted based on being in "track" mode. Method 700 may also adjust engine control parameters and suspension control parameters for operating in "track" mode. For example, method 700 may operate at an advanced spark timing to improve engine fuel economy as compared to when the vehicle is operated in "sport" mode. Method 700 proceeds to 742.

At 742, method 700 determines vehicle operating conditions. Vehicle operating conditions may include but are not limited to engine speed, engine load, vehicle speed, vehicle geographical position, presently engaged transmission gear, and ambient temperature. Method 700 proceeds to 744 after determining vehicle operating conditions.

At 744, method determines distances to preceding, trailing, and side vehicles, if present. The distances may be determined via ranging sensors as previously described. Method 700 proceeds to 726.

At 746, method 700 adjusts a position of an exhaust valve (e.g., 196a and/or 196b) according to the distance between the vehicle having the valve in its exhaust system and preceding, trailing, and side vehicles. In one example, the position of the exhaust valve is adjusted according to an exhaust valve opening amount adjustment value that is a function of distance between the vehicles. The exhaust valve opening amount adjustment value may be combined with other exhaust valve opening amount adjustment values that are based on engine speed, engine load, and other control parameters.

The exhaust valve opening amount adjustment values may be stored in maps or tables as shown in FIGS. 6A-6C. The maps include a map for "track" mode and the "track" mode map may be referenced via the distances between the vehicles. The map for "track" mode is referenced via distances between the vehicle having the valve in its exhaust system and other vehicles (e.g., preceding, trailing, and side vehicles) and the "track" mode map outputs an exhaust valve opening amount adjustment value. Method 700 adjusts the position of the exhaust valve in response to exhaust valve opening amount adjustment value that is based on distances between the vehicles and "track" mode. In addition, method 700 adjusts the position of the exhaust valve according to other control parameters (e.g., engine speed and engine load). Method 700 proceeds to exit.

In this way, a position of an exhaust valve may be adjusted according to distances between vehicles. By adjusting the position of the exhaust valve based on distances between vehicles, it may be possible reduce a possibility of distracting drivers.

Thus, the method of FIG. 7 provides for a method for operating an exhaust system of an engine, comprising: adjusting a position of a valve in an exhaust system via a controller in response to a distance between a first vehicle that includes the exhaust valve and a second vehicle, the valve positioned downstream of an exhaust gas after treatment device. The method includes where adjusting the position of the valve includes closing the valve in response to the second vehicle being within a threshold distance of the first vehicle. The method further comprises estimating the distance via a range sensing device. The method includes where the range sensing device is a RADAR. The method includes where the range sensing device is a SONAR. The method includes where the range sensing device is a LIDAR. The method includes where adjusting the position of the valve includes adjusting a position of the valve while the first vehicle is moving.

The method of FIG. 7 also provides for a method for operating an exhaust system of an engine, comprising: adjusting a position of a valve in an exhaust system via a controller in response to an exhaust mode and a distance between a first vehicle and a second vehicle, the valve positioned downstream of an exhaust gas after treatment device. The method includes where the first vehicle includes the valve. The method further comprises adjusting the position of the valve in further response to a third vehicle. The method includes where adjusting the position of the valve includes adjusting the position of the valve as a function of a speed of the first vehicle. The method further comprises adjusting the position of the valve according to a selected valve mode in response to the first vehicle not being within a threshold distance of the second vehicle. The method includes where adjusting the position of the valve reduces a level of exhaust noise from the exhaust system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an exhaust system of an engine, comprising:
   adjusting a position of a valve in the exhaust system via a controller in response to a distance between a first vehicle that includes the valve in the exhaust system and a second vehicle, the valve positioned downstream of an exhaust gas after treatment device.

2. The method of claim 1, where adjusting the position of the valve includes closing the valve in response to the second vehicle being within a threshold distance of the first vehicle.

3. The method of claim 1, further comprising estimating the distance via a range sensing device.

4. The method of claim 3, where the range sensing device is a RADAR.

5. The method of claim 3, where the range sensing device is a SONAR.

6. The method of claim 3, where the range sensing device is a LIDAR.

7. The method of claim 1, where adjusting the position of the valve includes adjusting a position of the valve while the first vehicle is moving.

8. A vehicle system, comprising:
   an engine;
   an exhaust system coupled to the engine, the exhaust system including a valve positioned downstream of an emissions control device;
   a range sensing device; and
   a controller including executable instructions stored in non-transitory memory that cause the controller to adjust a position of the valve in response to an output of the range sensing device.

9. The vehicle system of claim 8, where the output indicates a distance between a first vehicle that includes the valve and a second vehicle.

10. The vehicle system of claim 9, where the range sensing device indicates a distance from a front of the first vehicle to a rear of the second vehicle.

11. The vehicle system of claim 9, where the range sensing device indicates a distance from a rear of the first vehicle to a front of the second vehicle.

12. The vehicle system of claim 9, where the range sensing device indicates a distance from a side of the first vehicle to a side of the second vehicle.

13. The vehicle system of claim 9, where adjusting the position of the valve includes closing the valve in response to the first vehicle being within a threshold distance of the second vehicle.

14. The vehicle system of claim 13, where the threshold distance is a function of a speed of the first vehicle.

15. A method for operating an exhaust system of an engine, comprising:
   adjusting a position of a valve in the exhaust system via a controller in response to an exhaust mode and a distance between a first vehicle and a second vehicle, the valve positioned downstream of an exhaust gas after treatment device.

16. The method of claim 15, where the first vehicle includes the valve.

17. The method of claim 16, further comprising adjusting the position of the valve in further response to a third vehicle.

18. The method of claim 17, where adjusting the position of the valve includes adjusting the position of the valve as a function of a speed of the first vehicle.

19. The method of claim 18, further comprising adjusting the position of the valve according to a selected valve mode in response to the first vehicle not being within a threshold distance of the second vehicle.

20. The method of claim 15, where adjusting the position of the valve reduces a level of exhaust noise from the exhaust system.

* * * * *